United States Patent
De Morais et al.

(10) Patent No.: US 9,777,782 B2
(45) Date of Patent: Oct. 3, 2017

(54) SHARED ANCHOR BRACKET FOR A DISC BRAKE ASSEMBLY HAVING SEPARATE SERVICE AND PARKING BRAKE ASSEMBLIES

(71) Applicant: Kelsey-Hayes Company, Livonia, MI (US)

(72) Inventors: Antonio Eduardo De Morais, Livonia, MI (US); Sky Lintner, Livonia, MI (US); Chris McCormick, Livonia, MI (US); Jess Peak, Livonia, MI (US); Marcelo Delgado, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 14/898,261

(22) PCT Filed: Jun. 19, 2014

(86) PCT No.: PCT/US2014/043115
§ 371 (c)(1),
(2) Date: Dec. 14, 2015

(87) PCT Pub. No.: WO2014/205176
PCT Pub. Date: Dec. 24, 2014

(65) Prior Publication Data
US 2016/0131207 A1    May 12, 2016

Related U.S. Application Data

(60) Provisional application No. 61/836,910, filed on Jun. 19, 2013.

(51) Int. Cl.
*F16D 55/226*    (2006.01)
*F16D 121/04*    (2012.01)
(Continued)

(52) U.S. Cl.
CPC .... *F16D 55/226* (2013.01); *F16D 2055/0016* (2013.01); *F16D 2121/04* (2013.01); *F16D 2121/24* (2013.01); *F16D 2123/00* (2013.01)

(58) Field of Classification Search
CPC .. F16D 55/226; F16D 55/227; F16D 55/2265; F16D 65/097; F16D 2055/0016; F16D 2055/0066; F16D 2055/0091
(Continued)

(56) References Cited

U.S. PATENT DOCUMENTS 3,052,326 A  *  9/1962  Baisch .................. F16D 55/228
                                                188/106 R
3,077,954 A  *  2/1963  Ihnacik, Jr. ........... F16D 55/228
                                                188/218 XL
(Continued)

FOREIGN PATENT DOCUMENTS

JP    05196068 A  *  8/1993
JP    11230201 A  *  8/1999
(Continued)

OTHER PUBLICATIONS

PCT International Search Report, Application No. PCT/US2014/043115, dated Oct. 10, 2014.

*Primary Examiner* — Thomas J Williams
(74) *Attorney, Agent, or Firm* — MacMillan, Sobanski & Todd, LLC

(57) ABSTRACT

A disc brake assembly having an anchor bracket, a disc type of service brake assembly having a first brake caliper configured to be secured to the anchor bracket; and an electric disc type of parking and emergency brake assembly having a second brake caliper configured to be secured to the anchor bracket.

17 Claims, 6 Drawing Sheets

(51) Int. Cl.
*F16D 121/24* (2012.01)
*F16D 123/00* (2012.01)
*F16D 55/00* (2006.01)

(58) Field of Classification Search
USPC .................................................... 188/73.45
See application file for complete search history.

(56) References Cited

U.S. PATENT DOCUMENTS

| | | | | |
|---|---|---|---|---|
| 3,119,468 | A | * | 1/1964 | Mossey ................. F16D 65/095 |
| | | | | 188/152 |
| 4,747,472 | A | * | 5/1988 | Rath ..................... F16D 65/095 |
| | | | | 188/218 A |
| 6,488,132 | B2 | * | 12/2002 | Matsuishi ............... B60T 1/065 |
| | | | | 188/72.6 |
| 9,272,695 | B2 | * | 3/2016 | Liao ...................... B60T 13/741 |
| 2005/0167212 | A1 | | 8/2005 | Pascucci et al. |
| 2010/0032250 | A1 | * | 2/2010 | Cantoni .............. F16D 55/2262 |
| | | | | 188/72.3 |
| 2010/0147633 | A1 | * | 6/2010 | Kim ........................ B60T 8/345 |
| | | | | 188/72.7 |

FOREIGN PATENT DOCUMENTS

| | | | | |
|---|---|---|---|---|
| JP | EP 1186524 | A2 * | 3/2002 | ............. B60T 1/065 |
| WO | 2009016660 | A1 | 2/2009 | |

\* cited by examiner

SHARED ANCHOR BRACKET FOR A DISC BRAKE ASSEMBLY HAVING SEPARATE SERVICE AND PARKING BRAKE ASSEMBLIES

BACKGROUND OF THE INVENTION

This invention relates in general to vehicle brake assemblies and in particular to an improved structure for a shared anchor bracket for use in a disc brake assembly having separate service and parking brake assemblies.

Most vehicles today are equipped with a brake system for retarding or stopping movement of the vehicle in a controlled manner. A typical brake system for an automobile or truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are typically actuated by hydraulic or pneumatic pressure generated when an operator of the vehicle depresses a brake pedal. The structures of these drum brake assemblies and disc brake assemblies, as well as the actuators therefore are well known in the art.

A typical disc brake assembly includes an anchor bracket which is secured to a fixed, non-rotatable component of the vehicle. A pair of brake shoes are supported on the anchor bracket for sliding movement relative thereto. The brake shoes have respective friction pads which are disposed on opposite sides of a brake disc. The disc, in turn, is connected to the wheel of the vehicle for rotation therewith. To effect braking action, the brake shoes are moved inwardly toward one another so as to frictionally engage the opposed sides of the disc. Such frictional engagement causes retarding or stopping of the rotational movement of the disc and, therefore, the wheel of the vehicle in a controlled manner.

To accomplish this, the disc brake assembly further includes a caliper assembly for selectively moving the brake shoes into frictional engagement with the brake disc. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the caliper inboard leg adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the disc. Because the caliper is slidably mounted on the pins of the anchor bracket, the caliper outboard leg (and, thus, the outboard brake shoe disposed adjacent thereto) are urged inwardly toward the outer side of the disc. As result, the brake shoes frictionally engage the opposed sides of the disc.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner. U.S. Pat. No. 8,011,482 to Boyle et al., the disclosure of which is incorporated by reference herein in entirety, discloses a similar type of drum-in-hat disc brake assembly except that the assembly includes an electric actuator unit for actuating the parking and emergency brake of the drum-in-hat disc brake assembly.

SUMMARY OF THE INVENTION

This invention relates to an improved structure for a shared anchor bracket for use in a disc brake assembly having separate service and parking brake assemblies.

According to one embodiment, the disc brake assembly may comprise, individually and/or in combination, one or more of the following features: an anchor bracket, a disc type of service brake assembly having a first brake caliper configured to be secured to the anchor bracket; and an electric disc type of parking and emergency brake assembly having a second brake caliper configured to be secured to the anchor bracket.

According to this embodiment, the anchor bracket includes a first plurality of openings for operatively securing the anchor bracket to an associated component of a vehicle, a second plurality of openings for operatively securing the first brake caliper of the service brake assembly to the anchor bracket, and a third plurality of openings for operatively securing the second brake caliper of the parking and emergency brake assembly to the anchor bracket.

According to this embodiment, the electric actuator unit is configured to be operatively secured to the second brake caliper of the parking and emergency brake assembly in order to selectively operate the parking and emergency brake assembly.

According to this embodiment, the second brake caliper of the parking and emergency brake assembly is configured to be slidably supported relative to the anchor bracket by a pair of guide pins.

According to this embodiment, the parking and emergency brake assembly includes an inboard brake pad and an outboard brake pad, the inboard brake pad and the outboard brake pad being configured to be operatively carried relative to the second brake caliper by separate and distinct members.

According to this embodiment, the inboard brake pad is configured to be operatively carried by a pair of abutment pins, the abutments pins configured to be disposed in openings provided in the anchor bracket and openings provided in the inboard brake pad.

According to this embodiment, at least one spring is configured to be operatively connected to one of the abutment pins and the inboard brake pad to thereby prevent off-brake rattle.

According to this embodiment, the inboard brake pad includes an impression which is configured to receive a leg of the at least one spring.

According to this embodiment, the outboard brake pad is configured to be operatively carried by a pair of fingers of the first brake caliper.

According to this embodiment, the outboard brake pad includes a pair of semi-pierce holes which are configured to line up and extend through through holes provided in the fingers, and wherein a spring is configured to be attached to the outboard brake pad and abut against the fingers to thereby attach the outboard brake pad to the first brake caliper.

According to another embodiment, the disc brake assembly may comprise, individually and/or in combination, one or more of the following features: an anchor bracket having a first plurality of openings for operatively securing the anchor bracket to an associated component of a vehicle; a disc type of service brake assembly having a first brake caliper configured to be secured to the anchor bracket, wherein the anchor bracket includes a second plurality of openings for operatively securing the first brake caliper of the service brake assembly to the anchor bracket; an electric disc type of parking and emergency brake assembly having a second brake caliper configured to be secured to the anchor bracket, wherein the anchor bracket includes a third plurality of openings for operatively securing the second brake caliper of the parking and emergency brake assembly to the anchor bracket, wherein the second brake caliper is configured to be slidably supported relative to the anchor bracket by a pair of guide pins; and an electric actuator unit configured to operatively secured to the second brake caliper of the parking and emergency brake assembly, wherein the electric actuator unit is configured to be selectively operated to actuate the parking and emergency brake assembly.

According to this embodiment, the parking and emergency brake assembly includes an inboard brake pad and an outboard brake pad, the inboard brake pad and the outboard brake pad being configured to be operatively carried relative to the second brake caliper by separate and distinct members.

According to this embodiment, the inboard brake pad is configured to be operatively carried by a pair of abutment pins, the abutments pins configured to be disposed in openings provided in the anchor bracket and openings provided in the inboard brake pad.

According to this embodiment, at least one spring is configured to be operatively connected to one of the abutment pins and the inboard brake pad to thereby prevent off-brake rattle.

According to this embodiment, the inboard brake pad includes an impression which is configured to receive a leg of the at least one spring.

According to this embodiment, the outboard brake pad is configured to be operatively carried by a pair of fingers of the first brake caliper.

According to this embodiment, the outboard brake pad includes a pair of semi-pierce holes which are configured to line up and extend through through holes provided in the fingers, and wherein a spring is configured to be attached to the outboard brake pad and abut against the fingers to thereby attach the outboard brake pad to the first brake caliper.

According to another embodiment, the disc brake assembly may comprise, individually and/or in combination, one or more of the following features: an anchor bracket; a disc type of service brake assembly having a first brake caliper configured to be secured to the anchor bracket; an electric disc type of parking and emergency brake assembly having a second brake caliper configured to be secured to the anchor bracket; and an electric actuator unit configured to operatively secured to the second brake caliper of the parking and emergency brake assembly in order to selectively operate the parking and emergency brake assembly; wherein the parking and emergency brake assembly includes an inboard brake pad and an outboard brake pad, the inboard brake pad and the outboard brake pad being configured to be operatively carried relative to the second brake caliper by separate and distinct members.

According to this embodiment, the inboard brake pad is configured to be operatively carried by a pair of abutment pins, the abutments pins configured to be disposed in openings provided in the anchor bracket and openings provided in the inboard brake pad.

According to this embodiment, at least one spring is configured to be operatively connected to one of the abutment pins and the inboard brake pad to thereby prevent off-brake rattle.

According to this embodiment, the outboard brake pad is configured to be operatively carried by a pair of fingers of the first brake caliper.

According to this embodiment, the outboard brake pad includes a pair of semi-pierce holes which are configured to line up and extend through through holes provided in the fingers, and wherein a spring is configured to be attached to the outboard brake pad and abut against the fingers to thereby attach the outboard brake pad to the first brake caliper.

Other advantages of this invention will become apparent to those skilled in the art from the following detailed description of the invention, when read in light of the accompanying drawings.

DETAILED DESCRIPTION OF THE PREFERRED EMBODIMENT

Figure 1:
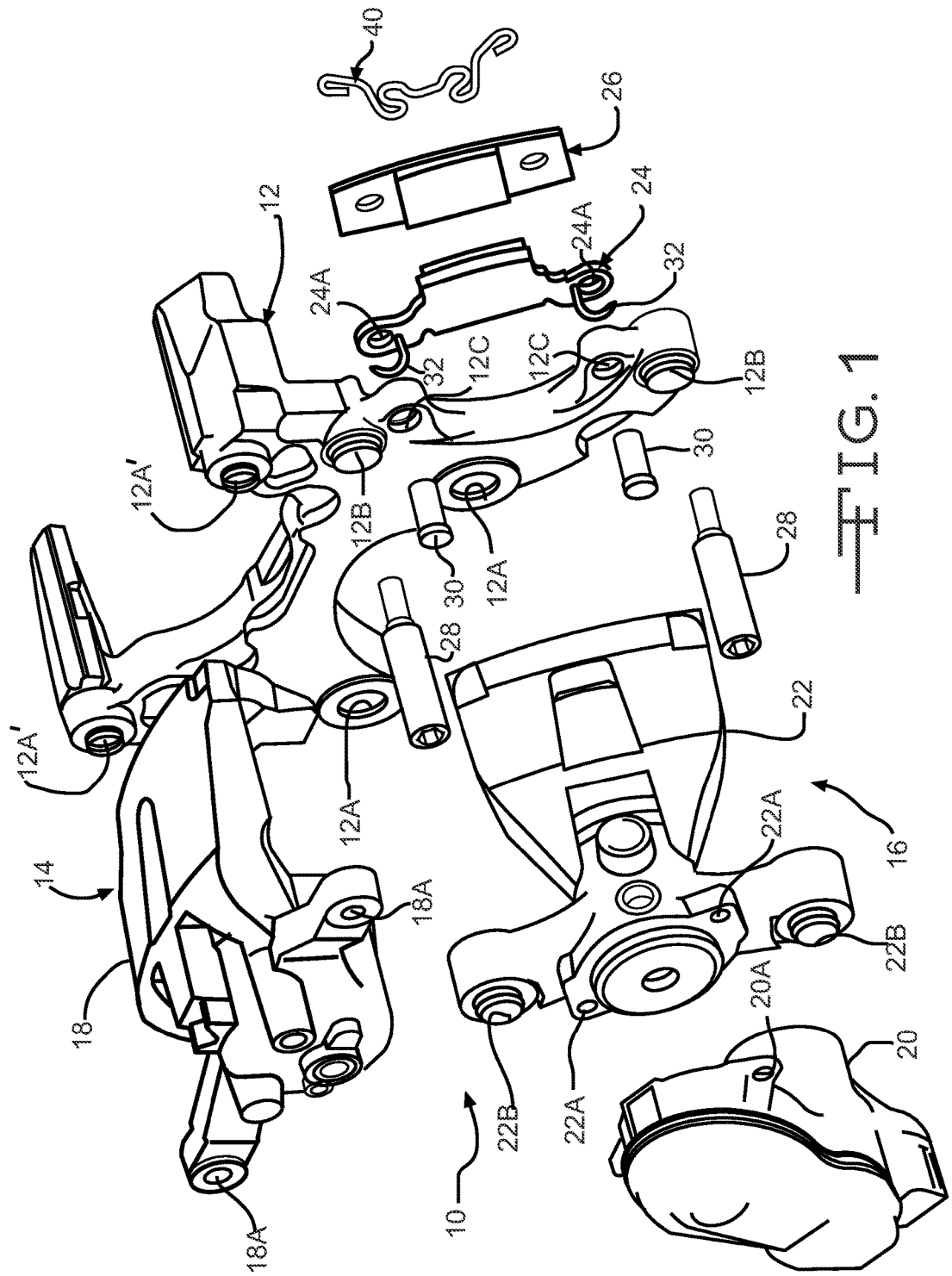
FIG. 1 is an exploded perspective view of a portion of an embodiment of a vehicle disc brake assembly, including a shared anchor bracket for the disc brake assembly which has separate service and parking brake assemblies.
Figure 2:
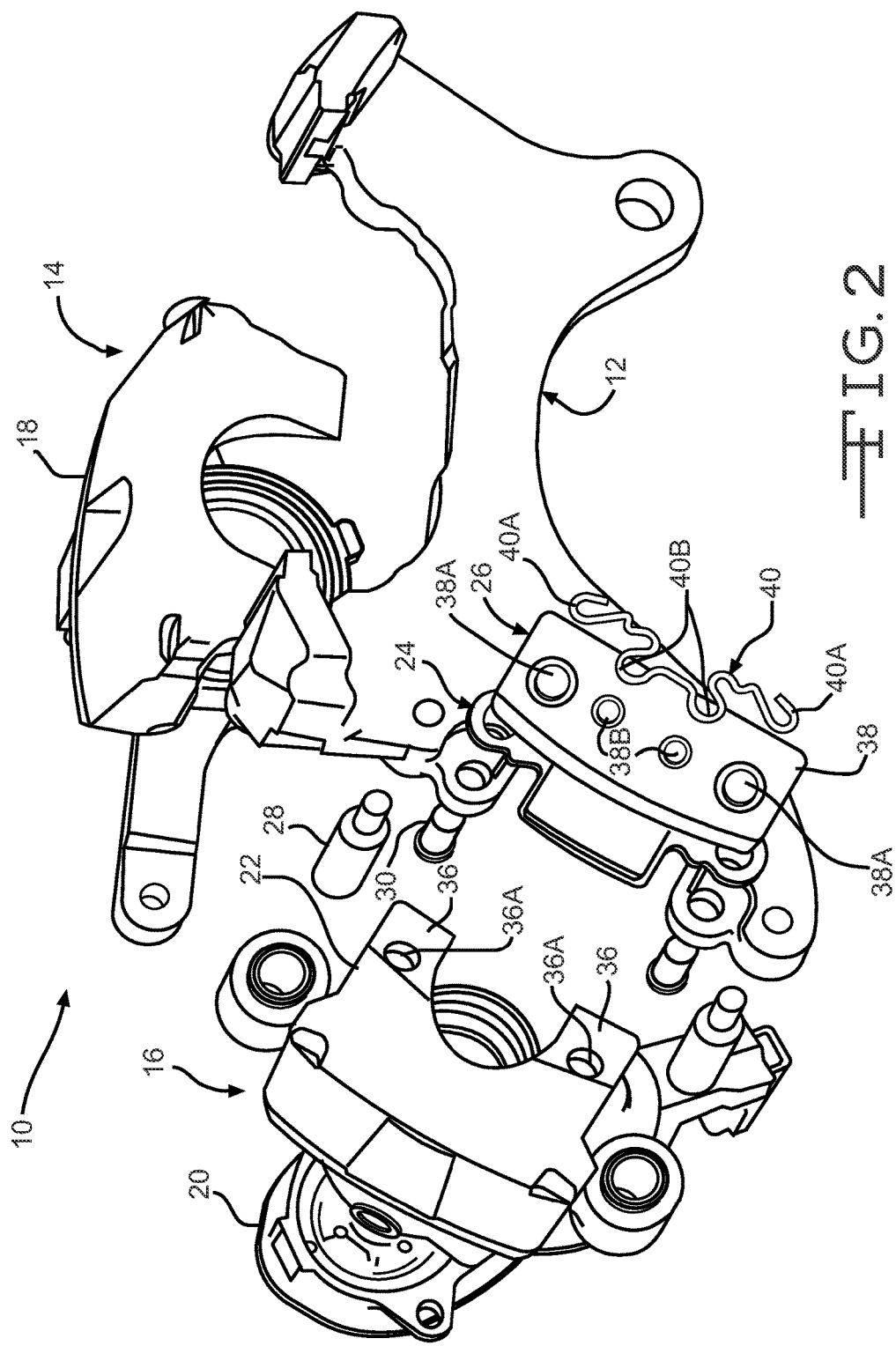
FIG. 2 is another exploded perspective view of a portion of the embodiment of the vehicle disc brake assembly illustrated in FIG. 1.
Figure 3:
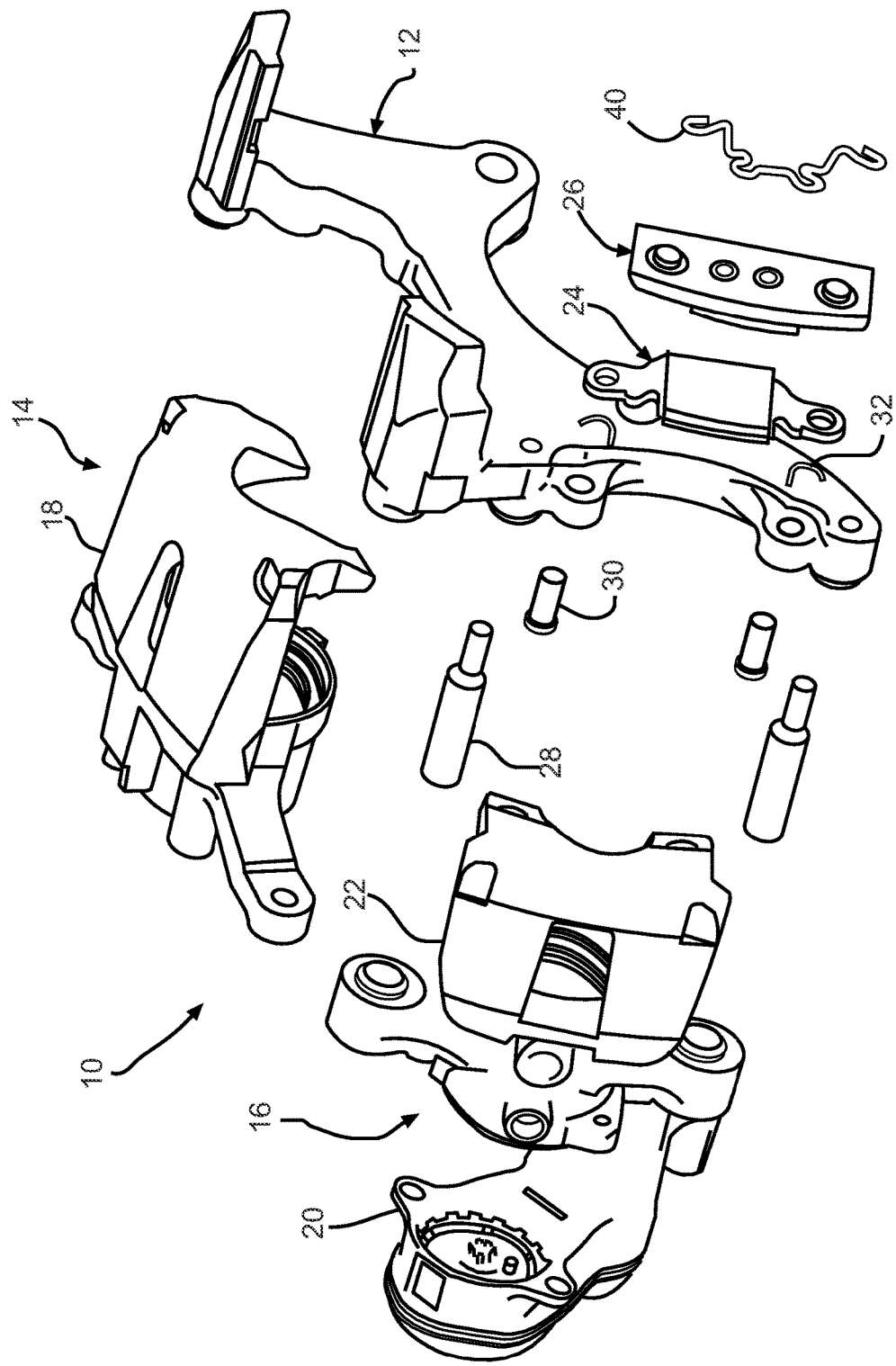
FIG. 3 is yet another exploded perspective view of a portion of the embodiment of the vehicle disc brake assembly illustrated in FIGS. 1-2.
Figure 4:
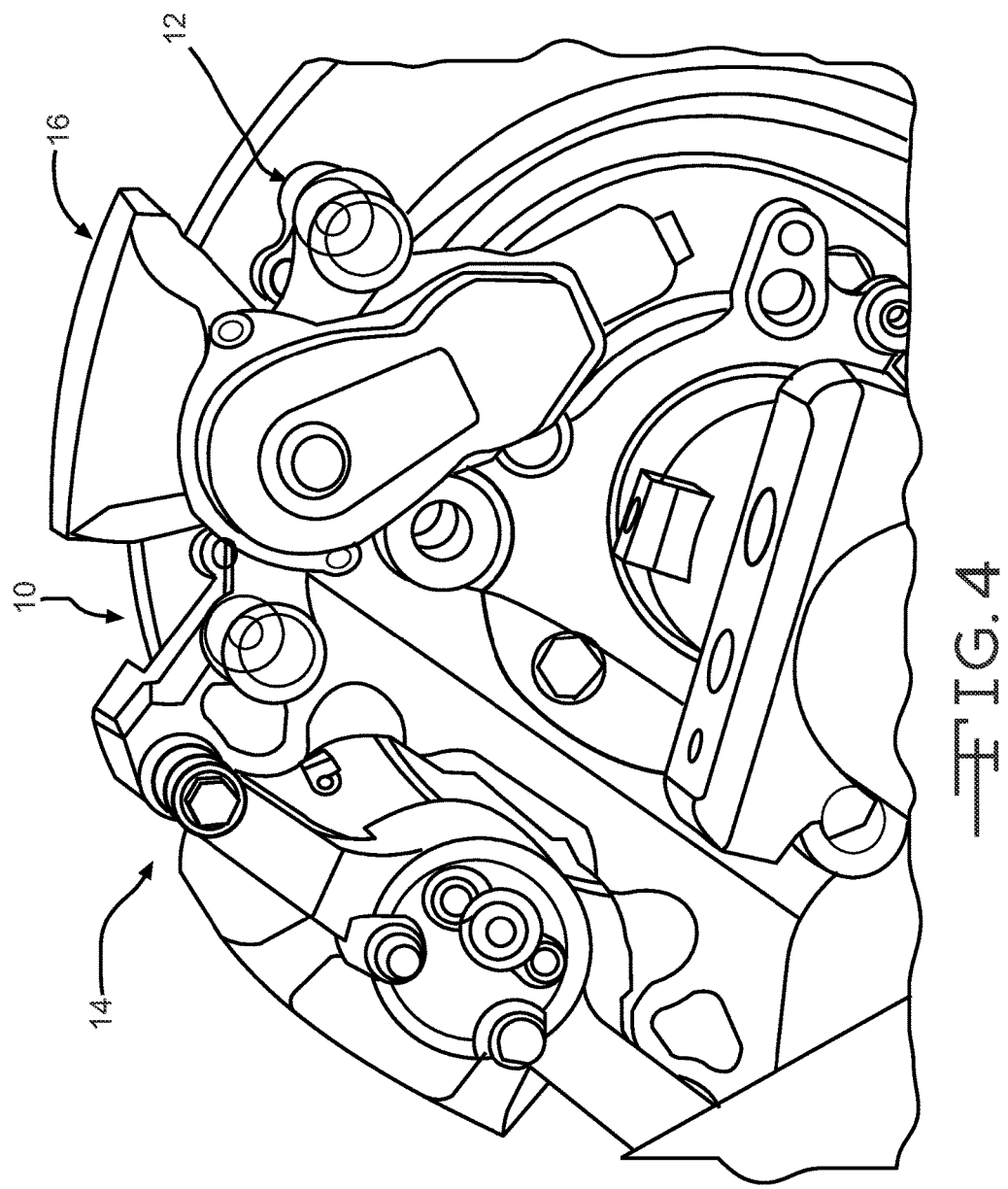
FIG. 4 is perspective view of a portion of the embodiment of the vehicle disc brake assembly illustrated in FIGS. 1-3 showing the assembly installed on a vehicle component.

Referring now to one or more of FIGS. 1-3, there is illustrated a portion of an embodiment of a vehicle disc brake assembly, indicated generally at 10, having a "shared" or "common" anchor bracket, indicated generally at 12, for supporting or carrying a separate service brake assembly, indicated generally at 14, and a separate parking brake and emergency brake assembly, indicated generally at 16. The general structure and operation of the service brake assembly 14 of the disc brake assembly 10 is generally conventional in the art. Thus, only those portions of the disc brake assembly 10, in particular, of the parking and emergency brake assembly 14, which are necessary for a full understanding of this invention will be explained and illustrated. Also, although this invention will be described and illustrated in connection with the particular disc brake assembly 10 disclosed herein, it will be appreciated that this invention may be used in connection with other types or kinds of disc brake assemblies, if so desired.

As shown in the illustrated embodiment of FIG. 1, the service brake assembly 14 of the disc brake assembly 10 is a pin guided or pin sliding type of disc brake assembly and includes the anchor bracket 12 which is secured to a stationary component of the vehicle by suitable fasteners, such as for example bolts (not shown), which extend through openings 12A provided in the anchor bracket 12. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

In the illustrated embodiment, the service brake assembly 14 includes a brake caliper 18 which is configured to be "slidably" supported by a pair of guide pin assemblies (not shown), relative to the anchor bracket 12. To accomplish this, the guide pin assemblies are configured to be installed in and operatively extend through openings 18A provided in the caliper 18 and to operatively extend into openings 12A' provided in the anchor bracket 12 in a known manner. The service brake assembly 14 can be hydraulically (or pneumatically) actuated in a known manner conventional in the art, and includes associated components, such as brake shoes, guide pin assemblies, actuating member(s), etc., which are known in the art, such as shown for example in U.S. Pat. No. 8,051,958 B2 to Rockwell et al., U.S. Pat. No. 6,345,701 B1 to Di Ponio, the disclosures of which are incorporated by reference herein in entirety. Alternatively, the type, construction and/or configuration of the service brake 14 and/or the type, construction, configuration and/or mounting of the brake caliper 18 to the anchor bracket 12 may be other than illustrated and described if so desired.

The parking and emergency brake assembly 16 is electrically or electronically actuated and includes an electric actuator unit 20, an electrically actuated brake caliper or housing 22, an inboard brake pad 24 and an outboard brake pad 26. In the illustrated embodiment, the actuator unit 20 is configured to be preferably actuated by a driver of the vehicle by suitable means, such as for example, by a push button switch and/or other suitable device, in order to selectively operate the parking and emergency brake assembly 16. In the illustrated embodiment, the actuator unit 20 is preferably configured to be mounted to the brake caliper 22 by two threaded fasteners (not shown), which extend though openings 20A of the actuator unit 20 and are received in threaded openings 22A provided in the brake caliper 22.

In the illustrated embodiment, the brake caliper 22 is preferably configured to be slidably supported relative to the anchor bracket 12 by a pair of guide pin assemblies, each of which includes at least a guide pin 28. In the illustrated embodiment, each of the guide pins 28 of the guide pin assemblies is configured to be operatively disposed in an opening 22B provided in the brake caliper 22 and operatively disposed in an opening 12B provided in the anchor bracket 12. Alternatively, the construction and/or configuration of the parking and emergency brake 16 and/or the type, construction, configuration and/or mounting of the brake caliper 22 to the anchor bracket 12 and/or the mounting of the actuator unit 20 to the brake caliper 22 may be other than illustrated and described herein, if so desired.

In the illustrated embodiment, the inboard brake pad 24 is configured to be operatively carried by a pair of abutment or support pins 30. To accomplish this in the illustrated embodiment, the abutment pins 30 are disposed in openings 12C provided in the anchor bracket 12 and the inboard brake pad 24 includes a pair of openings 24A through which the abutment pins 30 extend.

Figure 5:
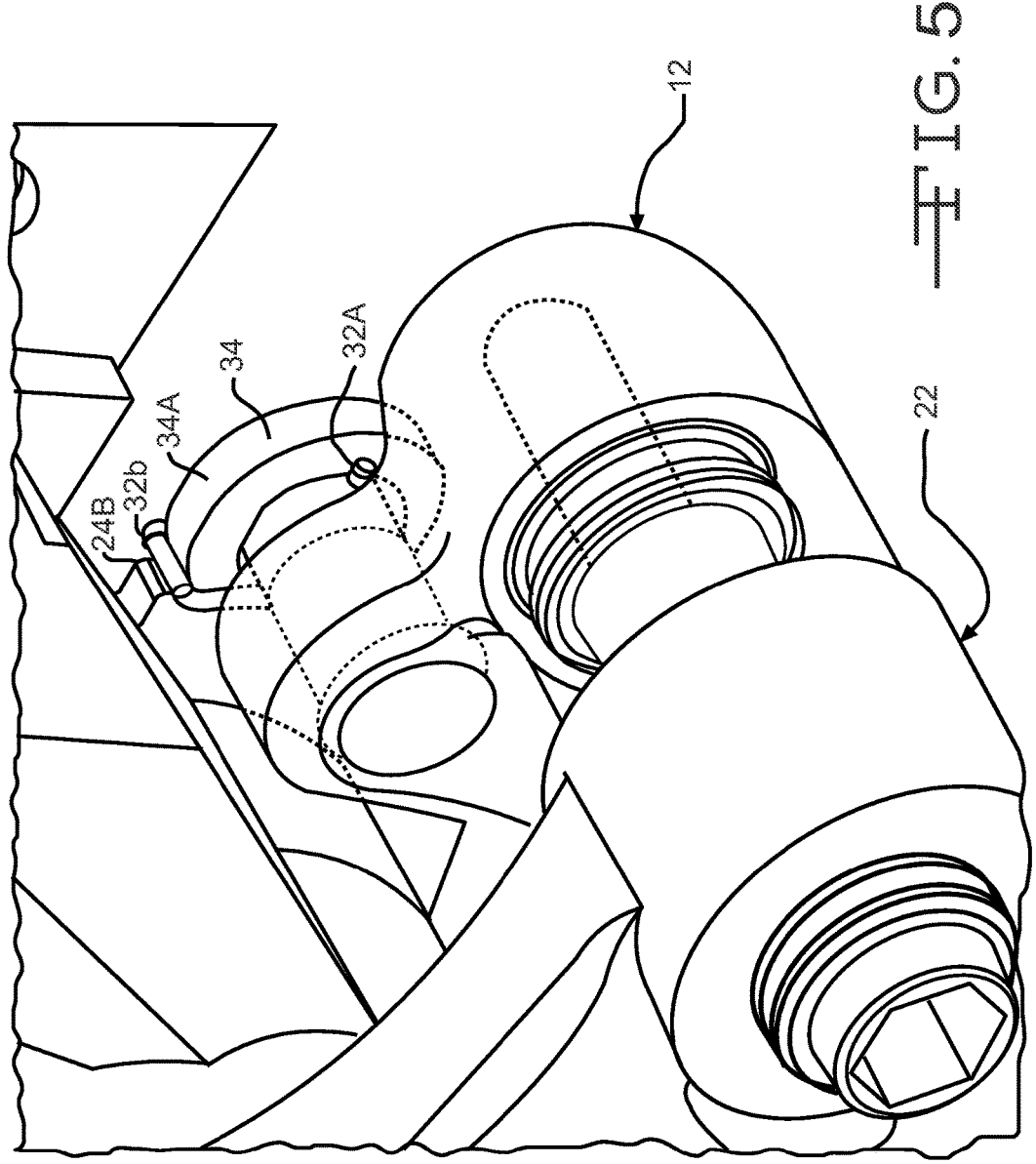
FIG. 5 is perspective view of a portion of the embodiment of the vehicle disc brake assembly illustrated in FIGS. 1-4.

Also, in the illustrated embodiment as best shown in FIG. 5, a pair of "wireform" springs 32 are preferably provided for the inboard brake pad 24 to prevent or mitigate rattle and/or noise. As can be seen in FIG. 5, a first leg or portion 32A of the spring 32 operatively wraps around a "lower" or "bottom" portion of the abutment pin 30, and a second leg or portion 32B of the spring 32 operatively connects or is carried by a top portion 34A of a backplate 34 of the inboard brake pad 24. As a result of this, each of the springs 32 is configured to produce a force which is operation to hold the backplate 34 of the inboard brake pad 24 against the abutment pins 30 so there is preferably no "off-brake" rattle or noise.

In the illustrated embodiment, the springs 32 may be installed by first "hooking" or attaching the first leg 32A of the spring 32 around the abutment pin 30 and then by rotating the spring 32 towards the backplate 34 and attaching the second leg 32B to the backplate 34. To assist in the retention of the second leg 32B of the spring 32 on the backplate 34, there can be provided an impression or indent 24B on the backplate 34 where the second leg 32B of the spring 32 will "sit" once installed. Alternatively, the type, construction, configuration and/or mounting of the inboard brake pad 24 to the anchor bracket 12 may be other than illustrated and described, if so desired.

In the illustrated embodiment, the outboard brake pad 26 is configured to be carried by a pair of outboard "fingers" 36 of the brake caliper 22, best shown in FIG. 2. To accomplish this, a backplate 38 of the outboard brake pad 26 is provided with a pair of semi-pierce holes 38A which line up with through holes 36A provided in the fingers 36. To assemble, the outboard brake pad 26 positioned within the underside of the brake caliper 12 and moved so that the semi-pierce holes 38A sit inside the through holes 36A of the fingers 36. Then, a spring 40, having a pair of outer end "loop" portions 40A and a pair inner "loop" portions 40B is installed.

Figure 6:
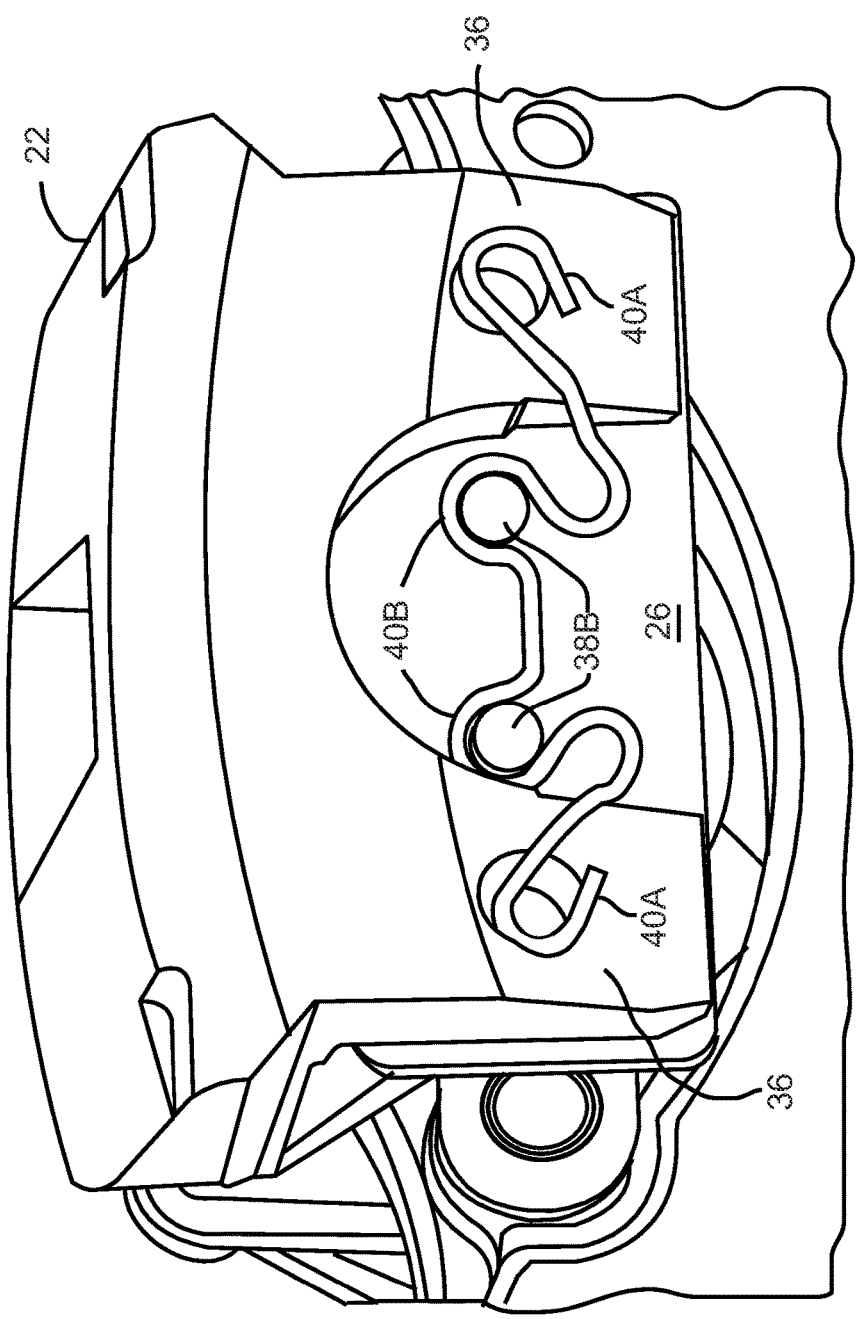
FIG. 6 is a perspective view of another portion of the embodiment of the vehicle disc brake assembly illustrated in FIGS. 1-4.

To accomplish this as best shown in FIG. 6, the inner loop portions 40B, which are in alignment with a pair of semi-pierce holes 38B formed on the backplate 38, are riveted or otherwise "fixedly" secured to the semi-pierce holes 38B of the backplate 38, and the outer loop portions 40A contact the outside of the fingers 36 to thereby retain the outboard brake pad 24 against the fingers 36 of the brake caliper 22. Alternatively, the type, construction, configuration and/or mounting of the outboard brake pad 26 to the anchor bracket 12 may be other than illustrated and described, if so desired.

One potential advantage of the illustrated embodiment is that by using the abutment pins 30, there is no need to use a broach tool to form a pad abutment (similar to the service brake that is shown). Rather, just another drilling operation is needed. Also, by using the abutment pins 30 they only react the torque from the inboard brake pad 24. The outboard brake pad 26 reacts through the associated brake caliper housing 22 and transfers the load to the associated guide pins 28. So essentially, the reaction is split between different components of the parking and emergency brake 16 of the disc brake assembly 10.

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly comprising:
an anchor bracket;
a disc type of service brake assembly having a first brake caliper configured to be secured to the anchor bracket; and
an electric disc type of parking and emergency brake assembly having a second brake caliper configured to be secured to the anchor bracket;
wherein the parking and emergency brake assembly includes an inboard brake pad and an outboard brake pad, the inboard brake pad and the outboard brake pad being configured to be operatively carried relative to the second brake caliper by separate and distinct members, wherein the inboard brake pad is configured to be operatively carried by a pair of abutment pins, the abutments pins configured to be disposed in openings provided in the anchor bracket and openings provided in the inboard brake pad.

2. The disc brake assembly of claim 1 wherein the anchor bracket includes a first plurality of openings for operatively securing the anchor bracket to an associated component of a vehicle, a second plurality of openings for operatively securing the first brake caliper of the service brake assembly to the anchor bracket, and a third plurality of openings for operatively securing the second brake caliper of the parking and emergency brake assembly to the anchor bracket.

3. The disc brake assembly of claim 1 wherein an electric actuator unit is configured to be operatively secured to the second brake caliper of the parking and emergency brake assembly in order to selectively operate the parking and emergency brake assembly.

4. The disc brake assembly of claim 1 wherein the second brake caliper of the parking and emergency brake assembly is configured to be slidably supported relative to the anchor bracket by a pair of guide pins.

5. The disc brake assembly of claim 1 wherein at least one spring is configured to be operatively connected to one of the abutment pins and the inboard brake pad to thereby prevent off-brake rattle.

6. The disc brake assembly of claim 5 wherein the inboard brake pad includes an impression which is configured to receive a leg of the at least one spring.

7. The disc brake assembly of claim 1 wherein the outboard brake pad is configured to be operatively carried by a pair of fingers of the second brake caliper.

8. The disc brake assembly of claim 7 wherein the outboard brake pad includes a pair of semi-pierce holes which are configured to line up and extend through through holes provided in the fingers, and wherein a spring is configured to be attached to the outboard brake pad and abut against the fingers to thereby attach the outboard brake pad to the first second brake caliper.

9. A disc brake assembly comprising:
an anchor bracket having a first plurality of openings for operatively securing the anchor bracket to an associated component of a vehicle;
a disc type of service brake assembly having a first brake caliper configured to be secured to the anchor bracket, wherein the anchor bracket includes a second plurality of openings for operatively securing the first brake caliper of the service brake assembly to the anchor bracket;
an electric disc type of parking and emergency brake assembly having a second brake caliper configured to be secured to the anchor bracket, wherein the anchor bracket includes a third plurality of openings for operatively securing the second brake caliper of the parking and emergency brake assembly to the anchor bracket, wherein the second brake caliper is configured to be slidably supported relative to the anchor bracket by a pair of guide pins; and
an electric actuator unit configured to be operatively secured to the second brake caliper of the parking and emergency brake assembly, wherein the electric actuator unit is configured to be selectively operated to actuate the parking and emergency brake assembly;
wherein the parking and emergency brake assembly includes an inboard brake pad and an outboard brake pad, the inboard brake pad and the outboard brake pad being configured to be operatively carried relative to the second brake caliper by separate and distinct members, wherein the inboard brake pad is configured to be operatively carried by a pair of abutment pins, the abutments pins configured to be disposed in openings provided in the anchor bracket and openings provided in the inboard brake pad.

10. The disc brake assembly of claim 9 wherein at least one spring is configured to be operatively connected to one of the abutment pins and the inboard brake pad to thereby prevent off-brake rattle.

11. The disc brake assembly of claim 10 wherein the inboard brake pad includes an impression which is configured to receive a leg of the at least one spring.

12. The disc brake assembly of claim 9 wherein the outboard brake pad is configured to be operatively carried by a pair of fingers of the second brake caliper.

13. The disc brake assembly of claim 12 wherein the outboard brake pad includes a pair of semi-pierce holes which are configured to line up and extend through through holes provided in the fingers, and wherein a spring is configured to be attached to the outboard brake pad and abut against the fingers to thereby attach the outboard brake pad to the second brake caliper.

14. A disc brake assembly comprising:
an anchor bracket;
a disc type of service brake assembly having a first brake caliper configured to be secured to the anchor bracket;
an electric disc type of parking and emergency brake assembly having a second brake caliper configured to be secured to the anchor bracket; and
an electric actuator unit configured to be operatively secured to the second brake caliper of the parking and emergency brake assembly in order to selectively operate the parking and emergency brake assembly;
wherein the parking and emergency brake assembly includes an inboard brake pad and an outboard brake pad, the inboard brake pad and the outboard brake pad being configured to be operatively carried relative to the second brake caliper by separate and distinct members, wherein the inboard brake pad is configured to be operatively carried by a pair of abutment pins, the abutments pins configured to be disposed in openings provided in the anchor bracket and openings provided in the inboard brake pad.

15. The disc brake assembly of claim 14 wherein at least one spring is configured to be operatively connected to one of the abutment pins and the inboard brake pad to thereby prevent off-brake rattle.

16. The disc brake assembly of claim 14 wherein the outboard brake pad is configured to be operatively carried by a pair of fingers of the second brake caliper.

17. The disc brake assembly of claim 16 wherein the outboard brake pad includes a pair of semi-pierce holes which are configured to line up and extend through through holes provided in the fingers, and wherein a spring is configured to be attached to the outboard brake pad and abut against the fingers to thereby attach the outboard brake pad to the second brake caliper.

* * * * *